US008719826B2

(12) United States Patent
Baeuerle et al.

(10) Patent No.: US 8,719,826 B2
(45) Date of Patent: May 6, 2014

(54) WORK FLOW MODEL PROCESSING WITH WEAK DEPENDENCIES THAT ALLOWS RUNTIME INSERTION OF ADDITIONAL TASKS

(75) Inventors: Stefan Baeuerle, Rauenberg (DE); Marita Kruempelmann, Dielheim (DE); Marek Kowalkiewicz, St. Lucia (AU); Ruopeng Lu, Taringa (AU); Sonia Lippe, Heidelberg-Kirchheim (DE)

(73) Assignee: SAP AG, Walldorf (DE)

( * ) Notice: Subject to any disclaimer, the term of this patent is extended or adjusted under 35 U.S.C. 154(b) by 943 days.

(21) Appl. No.: 11/963,775

(22) Filed: Dec. 21, 2007

(65) Prior Publication Data

US 2009/0164996 A1    Jun. 25, 2009

(51) Int. Cl.
*G06F 9/46* (2006.01)
*G06F 9/44* (2006.01)
*G06Q 10/00* (2012.01)
*G06F 9/48* (2006.01)
*G06F 9/52* (2006.01)
*G06Q 10/06* (2012.01)
*G06F 9/50* (2006.01)
*G06Q 10/10* (2012.01)

(52) U.S. Cl.
CPC ............ *G06F 9/4843* (2013.01); *G06F 9/4881* (2013.01); *G06F 9/52* (2013.01); *G06F 9/5038* (2013.01); *G06Q 10/06* (2013.01); *G06Q 10/06316* (2013.01); *G06Q 10/103* (2013.01)
USPC ........... 718/102; 718/100; 718/106; 717/101; 705/7.12; 705/7.22; 705/7.26

(58) Field of Classification Search
None
See application file for complete search history.

(56) References Cited

U.S. PATENT DOCUMENTS

| | | | | |
|---|---|---|---|---|
| 5,563,994 | A * | 10/1996 | Harmon et al. | 345/440 |
| 5,801,692 | A * | 9/1998 | Muzio et al. | 715/764 |
| 6,225,998 | B1 * | 5/2001 | Okita et al. | 715/853 |
| 6,263,278 | B1 * | 7/2001 | Nikiel et al. | 701/210 |
| 7,330,822 | B1 * | 2/2008 | Robson et al. | 705/7.15 |
| 7,543,292 | B2 * | 6/2009 | Haller et al. | 718/100 |
| 7,590,614 | B2 * | 9/2009 | Fildebrandt et al. | 707/999.001 |
| 7,885,840 | B2 * | 2/2011 | Sadiq et al. | 1/1 |
| 8,010,940 | B2 * | 8/2011 | van Wyk et al. | 717/105 |
| 2006/0080616 | A1 * | 4/2006 | Vogel et al. | 715/769 |
| 2006/0107265 | A1 * | 5/2006 | Schulz et al. | 718/100 |
| 2007/0245300 | A1 * | 10/2007 | Chan et al. | 717/105 |

* cited by examiner

*Primary Examiner* — Meng An
*Assistant Examiner* — Bing Zhao
(74) *Attorney, Agent, or Firm* — Mintz Levin Cohn Ferris Glovsky and Popeo, P.C.

(57) ABSTRACT

The subject matter disclosed herein provides methods and apparatus, including computer program products, for providing a weak dependency linking two tasks of a workflow of task. In one aspect, there is provided a computer-implemented method. The method receives, from a user interface, an indication representing a link between a first task and a second task. The link being a weak dependency linking the first and second task. The weak dependency representing that one or more tasks may be inserted between the first and second tasks. The first and second tasks including the link representing the weak dependency may be provided to the user interface. The link presented at the user interface to enable identification of the weak dependency. Related apparatus, systems, methods, and articles are also described.

12 Claims, 5 Drawing Sheets

WORK FLOW MODEL PROCESSING WITH WEAK DEPENDENCIES THAT ALLOWS RUNTIME INSERTION OF ADDITIONAL TASKS

FIELD

The subject matter described herein relates to modeling workflows.

BACKGROUND

In some commercial business process management systems (BPMS), graph-based workflow models may be used as a mechanism to model a process being automated or executed. A typical graphical workflow model is highly prescriptive, and captures execution possibilities of the steps and options within the process. For example, a workflow model of a business process for purchasing inventory may have a number of tasks to describe the business process being implemented.

SUMMARY

The subject matter disclosed herein provides methods and apparatus, including computer program products, for providing a weak dependency in a workflow of tasks.

In one aspect, an indication representing a link between a first task and a second task is received from a user interface. The link is a weak dependency between the first task and second task. The weak dependency may represent that one or more tasks may be inserted between the first task and the second tasks. The first and second tasks including the link representing the weak dependency may be provided to the user interface. The link presented at the user interface enables identification of the weak dependency.

In some variations, one or more of the following may be included. The indication may be received as a message from the user interface. The message may include the link between the first task and the second task and information identifying that the link represents the weak dependency. The weak dependency may be configured as a data type by a workflow modeler and configured as a graphical representation distinguishable from another graphical representation of a strong dependency. The workflow modeler may provide to the user interface the link presented at the user interface as a graphical representation distinguishable as a dashed line from another graphical representation of a strong dependency represented as a solid line. The first and second tasks may be implemented as a plurality of tasks of a business process. Other task(s) may be inserted, based on the link representing the weak dependency, between the first task and the second task.

Articles are also described that comprise a tangibly embodied machine-readable medium (e.g., computer-readable medium) operable to cause one or more machines (e.g., computers, etc.) to result in operations described herein. Similarly, computer systems are also described that may include a processor and a memory coupled to the processor. The memory may include one or more programs that cause the processor to perform one or more of the operations described herein.

In some implementations, the subject matter described herein may provide one or more advantages. For example, the use of a graphical extension with additional notation elements for weak dependency may increase the expressive functionality of the graphical models and allow for defining possible modifications to a process, such as a workflow.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

In the drawings.

Like reference symbols in the various drawings indicate like elements.

DETAILED DESCRIPTION

The implementations set forth in the following description do not represent all implementations consistent with the subject matter described herein. Instead, they are merely some examples consistent with certain aspects related to the described subject matter.

A workflow model may be represented as graphs (also referred to as workflow graphs or graph-based models). These graphs may include a set of nodes (e.g., representing tasks) connected by a set of linking arrows. An arrow connecting two nodes may indicate an immediate precedence relationship. This immediate precedence relationship may impose two requirements, which are that the first node is a precondition of the other node and that the latter node is performed immediately after (e.g., sequentially) the prior node. This immediate precedence relationship may be considered a so-called "strong dependency" in a workflow model and the relationship may be indicated in a graph-based model with a particular graphical notation of an arrow between squares representing tasks.

In contrast to a strong dependency, a so-called "weak dependency" may be used in graphical workflow model as a graph-based modeling construct to represent an interdependency between two tasks (i.e., workflow tasks). Similar to a graphical notation of a strong dependency, a graphical notation of a weak dependency may indicate a link between tasks, however, the graphical notation of weak dependency may differ from the graphical notation of a strong dependency to indicate that the two notations represent different dependency relationships between tasks. For example, a graphical notation of a strong dependency may be a solid arrow between squares representing tasks while a graphical notation of a weak dependency may be a dashed arrow between squares representing tasks. The graphical notation of a weak dependency may provide a visual indication of editable, flexible parts of a graph-based model of a workflow. In particular, the graphical notation of the weak dependency may indicate that the workflow model be changed by inserting an additional task in the workflow model for tasks connected by the interdependency relationship. The flexibility that may be provided by a weak dependency may be due to a contrast of the relationships between tasks. For example, in contrast to a strong dependency, for a weak dependency immediate condition precedence requirements may be decoupled.

Figure 1:
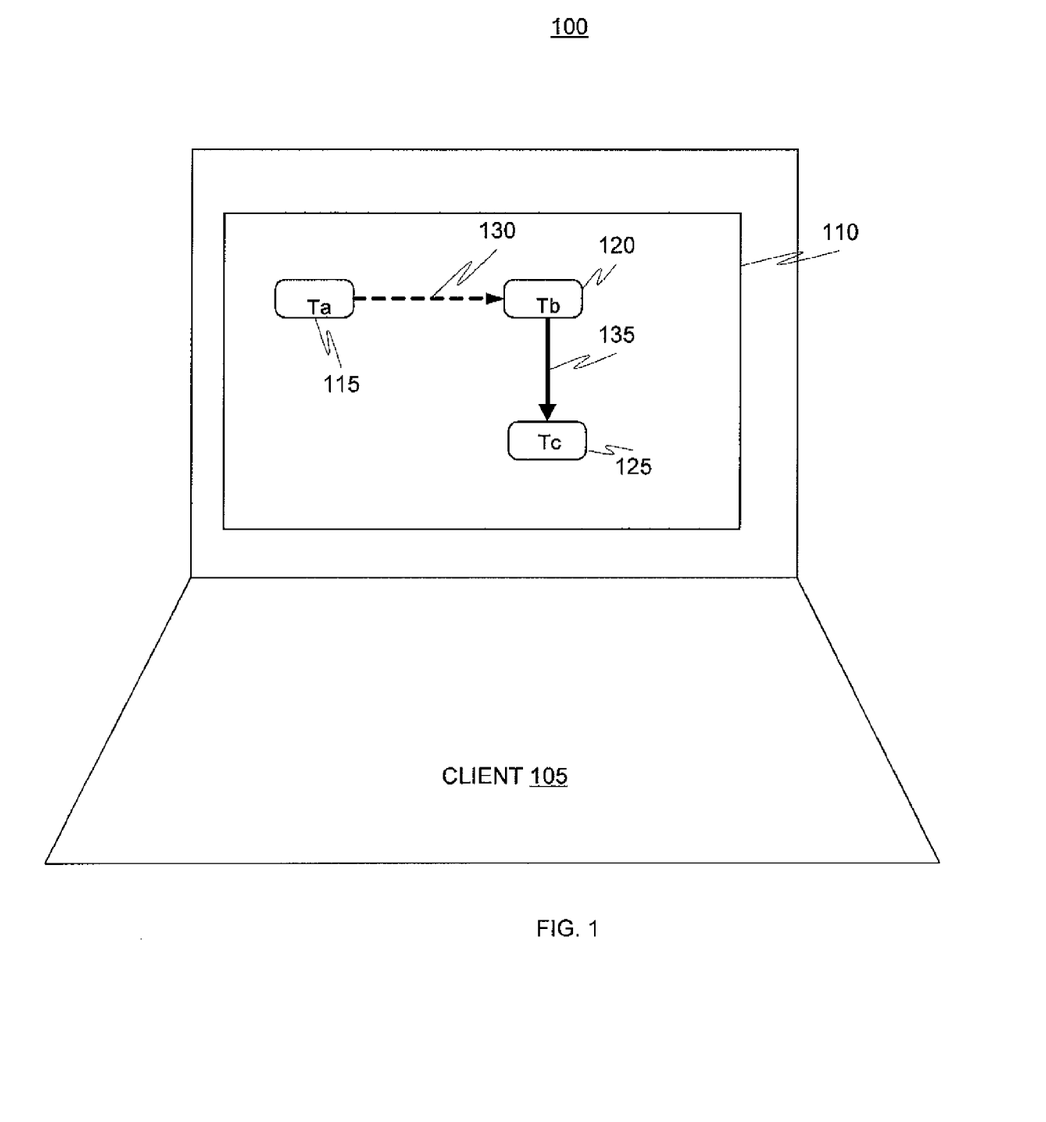
FIG. 1 depicts a user interface including a weak dependency.

FIG. 1 depicts a system 100 including a client 105 (e.g., a computer, a processor, and the like), a user interface 110, a first task 115 (labeled Ta), a second task 120 (labeled Tb), a third task 125 (labeled Tc), a weak dependency 130, and a strong dependency 135.

The user interface 110 may present at least one weak dependency 130 and at least one strong dependency 135. The user interface 110 may be any application used to interface with other applications. For example, user interface 110 may include a browser or a client application to interface with applications and services.

The user interface 110 is a user interface for a graph-based modeling tool, which may be referred to as a workflow modeler, that may be used to generate graph-based models (e.g., using a graphical editor, a flowcharting tool, and the like).

The term workflow may refer to one or more tasks of a process. For example, a workflow may be used to define business processes performed by an organization in the context of their day-to-day operations. Workflow models may allow a user of user interface 110 to manage and automate a business process. Workflow modeler may be located at client 105 or at a coupled server.

A graph-based model may define a workflow and may be represented graphically in user interface 110 as one or more tasks. For example, to handle an insurance claim, a workflow model may be defined with a workflow modeler through the user interface 110, and the model may have tasks such as receiving a claims form, transferring the claim form to a claims specialist, settling the claim, and disbursing a claim check to the policy holder. In another example, the user interface 110 may be used to model a workflow model of an apparel manufacturer inventory process where tasks represent the receiving of a purchase order for a man's shirt, shipping out a shirt to fulfill the purchase order, decrementing a value of shirts in inventory, and if necessary placing a purchase order to a vendor for more shirt material.

In another example, a workflow may be represented on the user interface 110 to model a rental car company reservation process. The workflow tasks in the rental car model may represent the receiving of a car reservation request, a check to see if a car is available, a confirmation message sent to the requester if a car is available, removal of a car from the available inventory of cars for specific time period, and the generation of a order to clean and prepare the car for the reservation.

In some implementations, a graph-based workflow model may be transformed by a workflow modeler to a rule-based workflow model having one or more rules, which may be used as an executable instance of a workflow model. In some implementations, executable instances of a workflow model may vary and a rule-based model need not be employed.

A first task 115 may be a business activity to be performed (e.g., ordering materials, shipping products, paying vendors, and the like). Likewise, a second task 120, and a third task 125 may also be tasks, such as business activities to be performed.

A weak dependency 130 may be a link associating the two tasks task 115 and task 120. The weak dependency 130 may be presented at user interface 110 with a graphical notation that differs from a graphical notation of a strong dependency, such as the graphical notation of the strong dependency 135 linking task 120 and task 125, such that the weak dependency represented by the graphical notation of the weak dependency 130 may be understood to have an interdependency relationship between tasks 115 and 120. The weak dependency 130 may be presented in any format to enable weak dependency 130 to be readily distinguished from strong dependency 135. For example, weak dependency 130 may be presented at user interface 110 as a dashed line, a dashed arrow, a wavy line, a line having a color or thickness, or any other format that is different from the graphical presentation of the strong dependency 135.

Weak dependency 130 may thus represent a link between tasks and provide a cue that at least one additional task may be inserted between the linked tasks.

To enable flexibility of the relationship between tasks linked by a weak dependency but disable flexibility between tasks linked by a strong dependency, a modeling tool may support distinctions between editing strong and weak dependencies of a workflow model or instances of a workflow model. In some implementations, a modeling tool that differs from a modeling tool used to generate a workflow model including weak and strong dependencies may enforce restrictions corresponding to strong dependencies. The additional modeling tool may enforce restrictions such that changes might not be made to the relationship between tasks connected by a strong dependency while the modeling tool may allow for changes to the workflow model where weak dependencies exist (e.g., by allowing for additional workflow tasks or control flow elements to be inserted).

As a graph-based workflow model may be transformed to a rule-based workflow model (e.g., when a workflow model is generated as a run-time instance for a rules engine to process a workflow), a weak dependency 130 may have a corresponding implementation as a rule (e.g., as code, as script, and/or as a complex data type) that a first task 115 precedes a second task 120 and that one or more additional tasks may be inserted between tasks 115 and 120. Examples of rule-based workflow modeling examples of weak dependencies are described below with reference to FIGS. 2E-2F.

Strong dependency 135 may be a link associating two tasks, such as tasks 120 and 125. The strong dependency 135 may be represented at user interface 110 to distinguish strong dependency 135 from weak dependency 130. Strong dependency 135 may be a link between tasks and be configured to have no additional task inserted between the linked tasks 120 and 125. Strong dependency 135 may thus define a rule that a second task 120 precedes a third task 125, that the completion of the second task 120 triggers the third task 125 to be preformed immediately after the second task 120, and that no other tasks may be inserted between tasks 120 and 125.

Figure 2A:
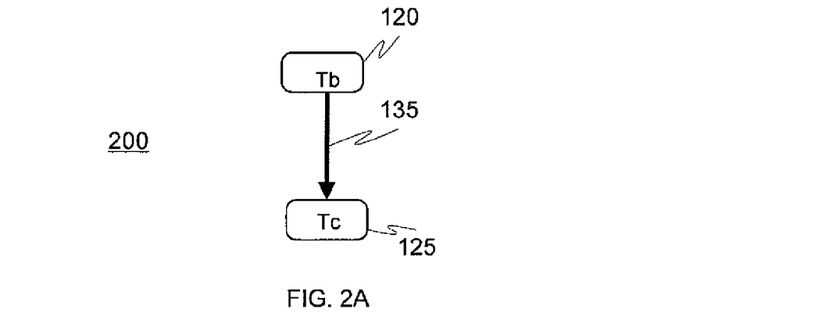
FIG. 2A depicts a first segment of a graphical workflow model.
Figure 2B:
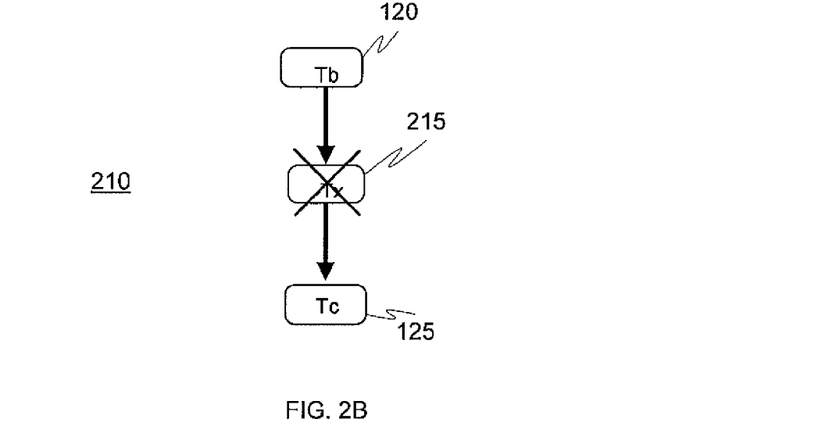
FIG. 2B depicts a second segment of a graphical workflow model.

FIG. 2A shows a portion 200 of a workflow model with strong dependency 135 between a pair of tasks 120, 125. The tasks 120 and 125 represent tasks, such as business activities, and the strong dependency 135 represents an associative link between the tasks. The workflow model of FIG. 2A has a descriptive nature in that the completeness of the model is assumed at design time, and model modification after creation and deployment might not be possible. As a result, workflow models with only strong dependencies might not be suitable to express flexible workflows. An inflexibility of strong dependencies is shown in a portion of a workflow model 210 in FIG. 2B, where an additional task 215 cannot be inserted between task Tb 120 and Tc 125 because of the strong dependency 135 connecting the two tasks in the previous FIG. 2A.

The workflow model 200 may be represented as a graph-based model at user interface 110. The workflow model 200 may be presented at user interface 110, while a workflow modeler may generate a deployable model that may be deployed to an enterprise system where further modeling may occur or the modeler may generate an instance of the workflow model 200 that may be executed by a workflow engine.

As an example, a workflow modeling tool may be used to generate the workflow model 200 which may be deployed, where the tasks may be arranged and the strong dependency 130 may be placed between the tasks. Following that example, the deployed workflow model may be interpreted by a modeling tool at a deployment, where restrictions associated with a strong dependency may be enforced and flexibility of a weak dependency may be supported such that the tasks may be inserted where a weak dependency exists. At deployment, the model may be finalized with strong dependencies (e.g., where weak dependencies once existed and among new tasks), which may result in a finalized model. From the finalized model, executable instances of the finalized model may be generated, which may be executed by a workflow process engine.

Figure 2C:
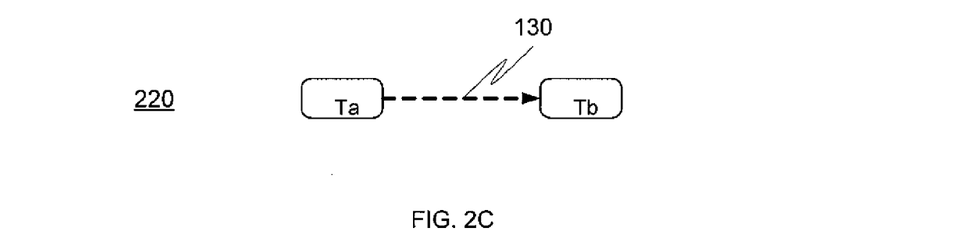
FIG. 2C depicts a third segment of a graphical workflow model.

FIG. 2C depicts a portion 220 of a workflow model with a weak dependency 130. The weak dependency 130 represents a weaker form of control of the workflow of tasks by allowing adaptation of the workflow model (e.g., by allowing for insertion of an additional task in the weak dependency link 130) after the generation of the model.

A weak dependency 130 between two tasks in a workflow model, such as Ta 115 and Tb 120, indicates that Ta 115 is the predecessor of Tb 120 (i.e., Ta is the pre-condition of Tb's execution), while additional tasks or sub-processes may be inserted between tasks 115 and 120. For example, in the previous car rental process outlined above, an additional task of checking to see if the car needs any maintenance may be inserted after the task of checking to see if a car is available, and before the task of sending a confirmation message to the requester by a user of a modeling tool (e.g., a modeling tool at an enterprise system landscape where restrictions with respect to strong dependency and flexibility with respect to a weak dependency is supported). A user interface of a modeling tool may present weak dependency 130 as a dotted or dashed line (and arrow) to distinguish the weak dependency 130 from the solid line (and arrow) of strong dependency 135, although weak dependency 130 may be presented in other forms as well.

Figure 2D:
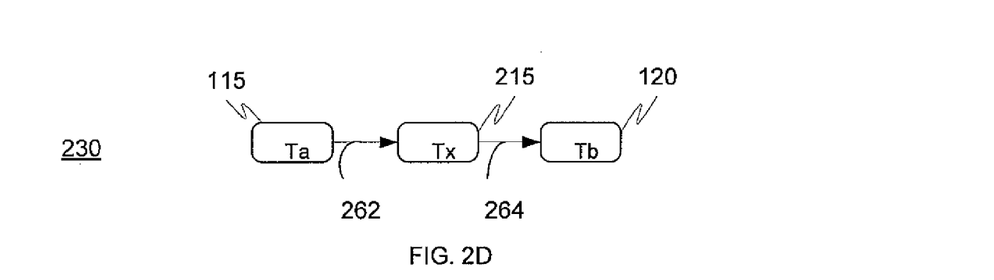
FIG. 2D depicts a fourth segment of a workflow representing a possible insertion of a task into FIG. 2C.

FIG. 2D shows a portion 230 of a workflow model with an adaptation of the model in FIG. 2C. In particular, FIG. 2D depicts an additional task Tx 215 inserted between tasks Ta 115 and Tb 120. Weak dependency 130 represents a connection between two tasks denoting only the interdependency between the tasks. Thus for example, task Ta 115 may be restricted to be performed ahead of task Tb 120 in time, but there is no requirement that task Ta 115 be performed immediately before task Tb 120 in time such that many tasks may separate the performance of tasks Ta 115 and Tb 120. The links 262 and 264 may be a weak dependency as well. Apart from tasks, more complex workflow modeling constructs (such as AND-Split and OR-Spilt) may also be used as well.

Adaptation of the model in FIG. 2C shown in FIG. 2D may be result in an adapted model or generation of an instance of a process. The generation of an instance of a process may be done at a later or subsequent time from the generation of the original workflow model in the user interface 110. Thus, a user may have the ability to change or adapt a workflow model in a specifically defined manner prior to generation of an instance of a process to a business process management system. In some implementations, a user may have control over which parts of a workflow model may be changed (e.g. through the insertion of additional tasks) after creation of the workflow model or after an instance of a workflow model is generated and executing. For example, during execution of a workflow model instance, a user may be prompted with the ability to make changes to a process. For example, a business process may be such that after a certain task, it is common for a workflow to change in an unpredictable way, such that a weak dependency may exist in an executable instance of the process. A workflow process engine may detect that weak dependency and request user intervention (e.g., a user may be prompted to finalize a portion of a workflow or add tasks). The user may adapt the workflow, and the workflow process engine may continue executing the process in accordance with the user-made adaptations. In some implementations, it may be less desirable to allow certain changes to a workflow model that may have been designed with industrial best practice and should not be altered. In other implementations, it may be desirable to allow certain changes to a workflow model after it has been deployed in order to allow the model to more accurately represent the underlying business process activity.

Figure 2E:
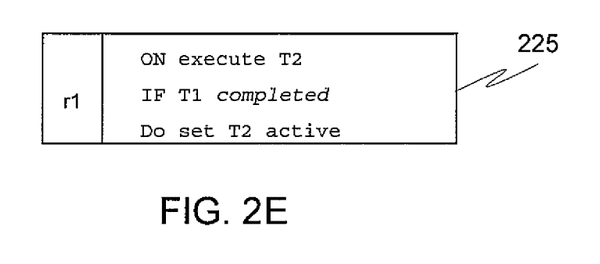
FIG. 2E depicts a rule-based implementation of a weak dependency.

FIG. 2E depicts a rule-based implementation of weak dependency. Rule 225 r1 sets the precondition of task T2's execution and there is no rule to trigger the evaluation of task T2. This rule-based implementation of weak dependency provides the flexibility for runtime modification, i.e., to insert additional task(s) or sub-processes before task T2, while still preserving the precondition of task T2 (which is the completion of task T1).

Figure 2F:
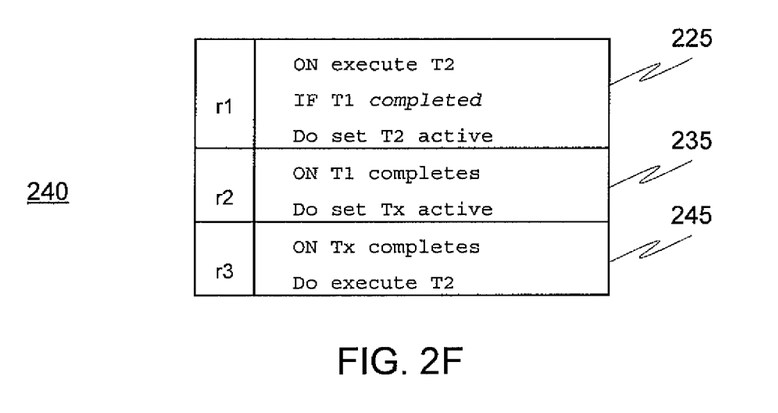
FIG. 2F depicts a rule-based implementation of strong dependencies that may be based on an adaptation of a weak dependency to a finalized workflow model.

FIG. 2F depicts a rule-based implementation of a strong dependencies that may be based on an adaptation of a weak dependency to a finalized workflow model. The set of rules 240 may represent a rule-based implementation of FIG. 2D. Rule 235 r2 triggers the execution of task Tx on the event when task T1 completes execution. Subsequently in rule 245 r3, when task Tx completes execution, the evaluation of task T2's precondition is triggered (rule 225 r1), and task T2 commences execution.

Figure 3:
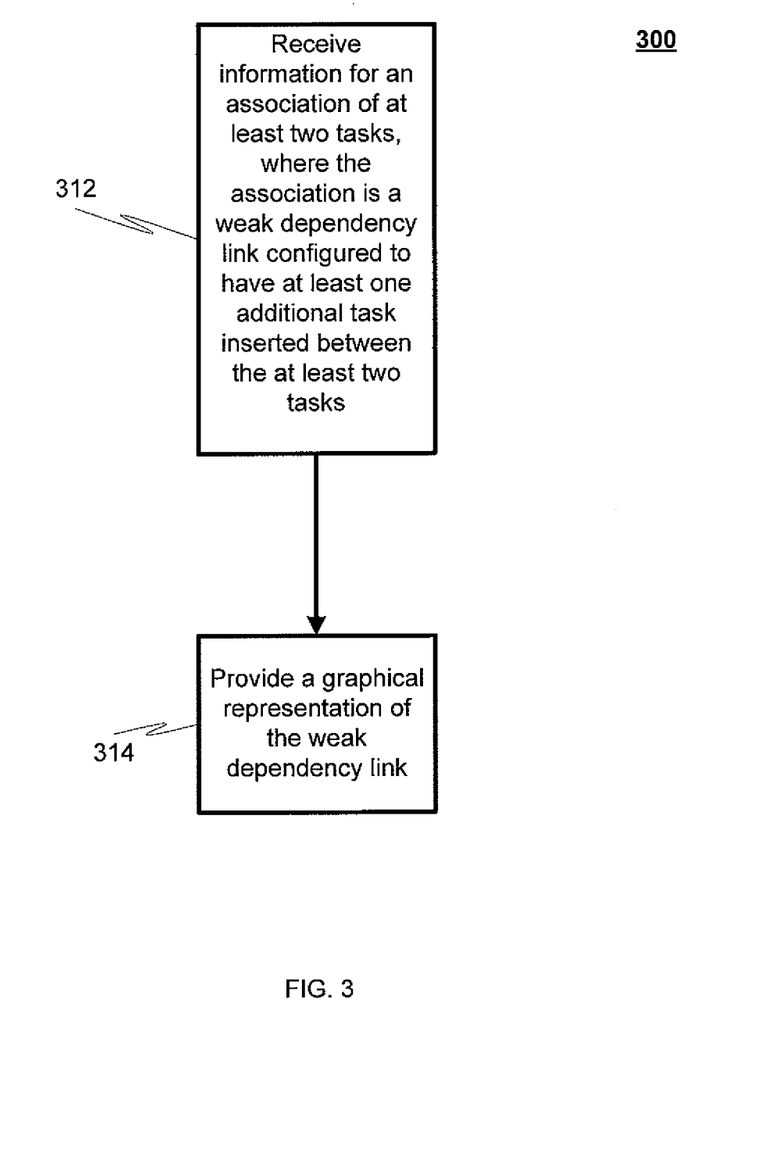
FIG. 3 depicts a process for providing a weak dependency.

FIG. 3 shows the process 300 for providing a weak dependency.

At 312, information is received to associate two tasks. The information may be received at a workflow modeler, such as a workflow modeler having the user interface 110 or another workflow modeler. The association may link at least two tasks of a workflow model. At user interface 110, a user may provide input resulting in the tasks at the workflow modeler to be manipulated (e.g., added, deleted, inserted, etc.) and links to generated associating of at least two tasks. For example, an action at user interface 110 may result in a message being sent to a workflow modeler. The message may include information representing a task, a link (e.g., a weak dependency or a strong dependency), and any other coupled tasks. The information received at 312 may include a weak dependency linking at least two tasks configured to have at least one additional task inserted between the at least two tasks. For example, a weak dependency 130 as depicted in FIGS. 2C and 2D may be implemented at the workflow modeler. In other words, the associated tasks are not required to be in a sequential ordered configuration and other tasks may be inserted between the at least two tasks at a later time or step.

At 314, once the process 300 receives an indication of a weak dependency 130, a graphical representation of the weak dependency 130 may be provided to the user interface 110 (e.g. a dashed or dotted arrow connecting two task boxes). The graphical representation, when presented at user interface 110, enables a user to readily determine that the link between two tasks is a weak dependency configurable to allow additional tasks to be inserted at anytime (e.g., design time, runtime, and the like).

Figure 4:
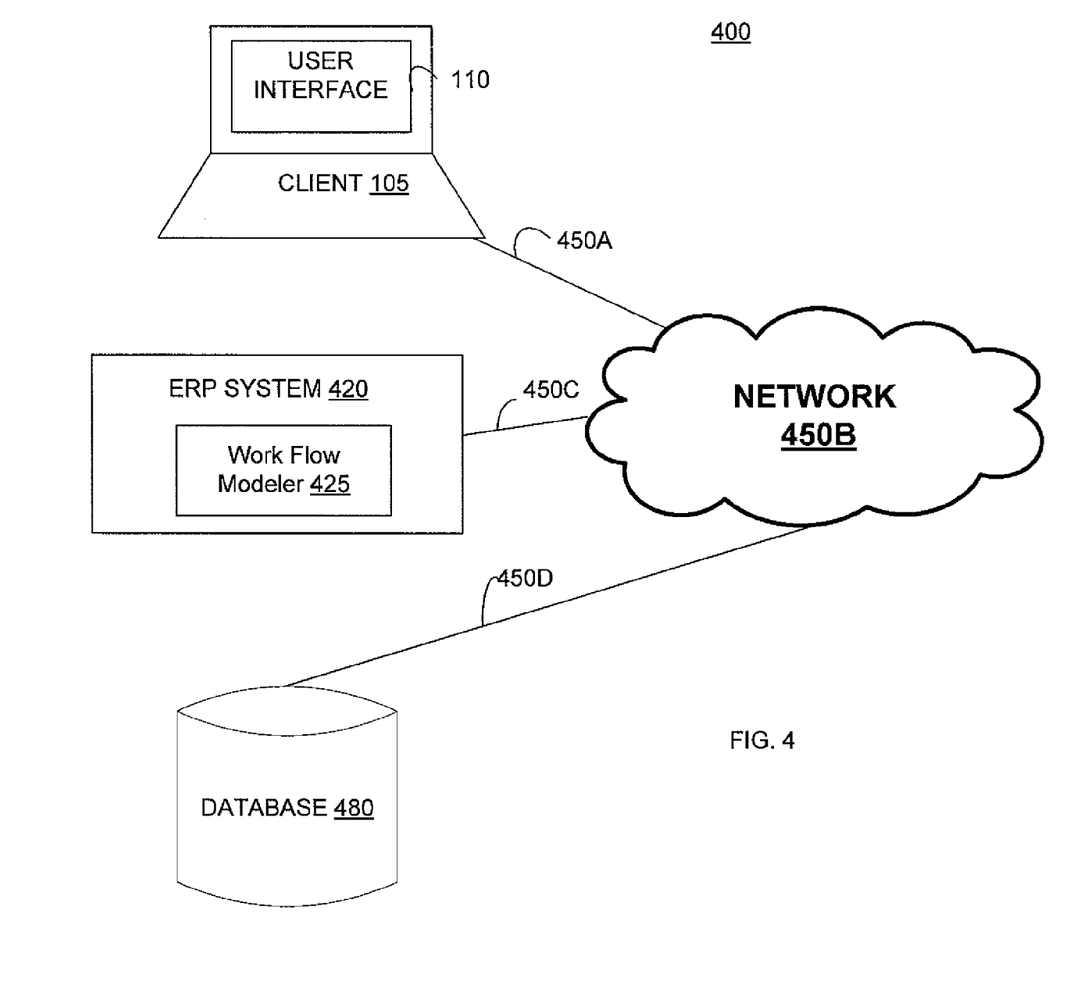
FIG. 4 depicts a block diagram of a system for providing a weak dependency in a process management system.

FIG. 4 depicts a block diagram of a system for providing a weak dependency in a process management system 400. The process management system 400 includes client 105 (e.g., a computer, a processor, and the like), an ERP (Enterprise Resource Planning) system 420 including a workflow modeler 425, a database 480, and a network 450A-D. The workflow modeler 425 (also referred to as a modeler tool) may receive from user interface 110 information associating two tasks (312 at FIG. 3) and provide a graphical representation of the weak dependency, as described above at 314. Workflow modeler 425 may also define rules, as depicted above at FIGS. 2E and 2F.

ERP system 420 may include one or more components (e.g., applications, services, applets, and the like) to provide an integrated system for the data and processes of an enterprise (e.g., an organization). ERP system 420 may automate many traditional business workflow tasks (e.g., querying one or more business objects, updating inventory lists, generating purchase orders and the like). Although FIG. 4 depicts ERP system 420, any other application may be used as well including a customer relationship management (CRM) application, a product lifecycle management application, a supply chain management (SCM) application, and a supplier relationship management application.

Database 480 may include business objects, tasks for a work list, and information describing one or more users of ERP system 420, workflow modeler 425, and user interface 110. Task information represents one or more tasks (e.g., items of work, jobs, and the like) that should be completed, such as tasks of a workflow model that has been completed.

Although FIG. 4 depicts ERP system 420, workflow modeler 425, client 105, and database 480 at separate locations, in some implementations, ERP system 420, client 105, and database 480 may be at other locations and/or distributed among multiple locations.

The subject matter described herein may be embodied in systems, apparatus, methods, and/or articles depending on the desired configuration. In particular, various implementations of the subject matter described herein may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications, applications, components, or code) include machine instructions for a programmable processor, and may be implemented in a high-level procedural and/or object-oriented programming language, and/or in assembly/machine language. As used herein, the term "machine-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal.

The term "machine-readable signal" refers to any signal used to provide machine instructions and/or data to a programmable processor.

To provide for interaction with a user, the subject matter described herein may be implemented on a computer having a display device (e.g., a CRT (cathode ray tube) or LCD (liquid crystal display) monitor) for displaying information to the user and a keyboard and a pointing device (e.g., a mouse or a trackball) by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The subject matter described herein may be implemented in a computing system that includes a back-end component (e.g., as a data server), or that includes a middleware component (e.g., an application server), or that includes a front-end component (e.g., a client computer having a graphical user interface or a Web browser through which a user may interact with an implementation of the subject matter described herein), or any combination of such back-end, middleware, or front-end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

The implementations set forth in the foregoing description do not represent all implementations consistent with the subject matter described herein. Instead, they are merely some examples consistent with aspects related to the described subject matter. Wherever possible, the same reference numbers will be used throughout the drawings to refer to the same or like parts.

Although a few variations have been described in detail above, other modifications or additions are possible. In particular, further features and/or variations may be provided in addition to those set forth herein. For example, the implementations described above may be directed to various combinations and subcombinations of the disclosed features and/or combinations and subcombinations of several further features disclosed above. Moreover, as used herein a user refers to a human or any other entity, such as a machine, computer, and the like. In addition, the logic flow depicted in the accompanying figures and/or described herein do not require the particular order shown, or sequential order, to achieve desirable results. Other embodiments may be within the scope of the following claims.

What is claimed:

1. A method comprising:
receiving, at one or more processors, a first message from a user interface, the message including a first indication representing a first link between a first task and a second task of a work flow model including a plurality of tasks, the first link being a strong dependency representing that execution of the second task occurs as a subsequent task to execution of the first task without any intervening tasks of the work flow model being executed before the second task is executed;

receiving, at the one or more processors, a second message from the user interface, the second message including a second indication representing a second link between the second task and a third task of the work flow model including the plurality of tasks, the second link being a weak dependency configured to allow execution of the third task to be delayed until after execution of a fourth task when the fourth task is inserted between the second task and the third task, wherein insertion of the fourth task between the second task and the third task creates a third link between the second task and the fourth task and a fourth link between the fourth task and the third task, the third link and the fourth link both being weak dependencies configured to allow insertion of additional tasks;

providing, by the one or more processors to the user interface, the first task coupled via the first link to the second task coupled via the second link to the third task, the first link configured as at least a first graphical element comprising a first line coupling the first task and the second task, and the second link configured as at least a second graphical element comprising a second line coupling the second task and the third task, the second link graphically distinct from the first link to enable identification, when presented at the user interface, of the weak dependency between the second task and the third task and to allow insertion of the fourth task between the second task and the third task; and providing, by the one or more processors to the user interface during execution of a process instance of the work flow model, a prompt requesting user intervention as to whether the weak dependency is to be finalized by converting the weak dependency into a strong dependency or preserving the weak dependency before adding the fourth task between the second task and the third task.

2. The method of claim 1, wherein the work flow model comprises a graph-based model executed by a workflow engine configured on the one or more processors, wherein the first line comprises a solid line, and the second line comprises a dashed line.

3. The method of claim 1, wherein the first task and the second task comprise tasks of a business process.

4. The method of claim 1 further comprising:
receiving, from the user interface, information identifying the one or more tasks.

5. A non-transitory computer-readable storage medium comprising instructions that when performed by a computer result in operations comprising:
receiving, at one or more processors, a first message from a user interface, the message including a first indication representing a first link between a first task and a second task of a work flow model including a plurality of tasks, the first link being a strong dependency representing that execution of the second task occurs as a subsequent task to execution of the first task without any intervening tasks of the work flow model being executed before the second task is executed;

receiving, at the one or more processors, a second message from the user interface, the second message including a second indication representing a second link between the second task and a third task of the work flow model including the plurality of tasks, the second link being a weak dependency configured to allow execution of the third task to be delayed until after execution of a fourth task when the fourth task is inserted between the second task and the third task, wherein insertion of the fourth task between the second task and the third task creates a third link between the second task and the fourth task and a fourth link between the fourth task and the third task, the third link and the fourth link both being weak dependencies configured to allow insertion of additional tasks;

providing, by the one or more processors to the user interface, the first task coupled via the first link to the second task coupled via the second link to the third task, the first link configured as at least a first graphical element comprising a first line coupling the first task and the second task, and the second link configured as at least a second graphical element comprising a second line coupling the second task and the third task, the second link graphically distinct from the first link to enable identification, when presented at the user interface, of the weak dependency between the second task and the third task and to allow insertion of the fourth task between the second task and the third task; and providing, by the one or more processors to the user interface during execution of a process instance of the work flow model, a prompt requesting user intervention as to whether the weak dependency is to be finalized by converting the weak dependency into a strong dependency or preserving the weak dependency before adding the fourth task between the second task and the third task.

6. The computer-readable storage medium of claim 5, wherein
the work flow model comprises a graph-based model executed by a workflow engine configured on the one or more processors, wherein the first line comprises a solid line, and the second line comprises a dashed line.

7. The computer-readable storage medium of claim 5, wherein the first task and the second task comprise tasks of business process.

8. The computer-readable storage medium of claim 5 further comprising:
receiving information identifying the one or more tasks.

9. A system comprising:
a processor; and
a memory, wherein the processor and the memory are configured to perform a method comprising:
receiving, at one or more processors, a first message from a user interface, the message including a first indication representing a first link between a first task and a second task of a work flow model including a plurality of tasks, the first link being a strong dependency representing that execution of the second task occurs as a subsequent task to execution of the first task without any intervening tasks of the work flow model being executed before the second task is executed;

receiving, at the one or more processors, a second message from the user interface, the second message including a second indication representing a second link between the second task and a third task of the work flow model including the plurality of tasks, the second link being a weak dependency configured to allow execution of the third task to be delayed until after execution of a fourth task when the fourth task is inserted between the second task and the third task, wherein insertion of the fourth task between the second task and the third task creates a third link between the second task and the fourth task and a fourth link between the fourth task and the third task, the third link and the fourth link both being weak dependencies configured to allow insertion of additional tasks;

providing, by the one or more processors to the user interface, the first task coupled via the first link to the second task coupled via the second link to the third task, the first link configured as at least a first graphical element comprising a first line coupling the first task and the second task, and the second link configured as at least a second graphical element comprising a second line coupling the second task and the third task, the second link graphically distinct from the first link to enable identification, when presented at the user interface, of the weak dependency between the second task and the third task and to allow insertion of the fourth task between the second task and the third task; and providing, by the one or more processors to the user interface during execution of a process instance of the work flow model, a prompt requesting user intervention as to whether the weak dependency is to be finalized by converting the weak dependency into a strong dependency or preserving the weak dependency before adding the fourth task between the second task and the third task.

10. The system of claim 9, wherein the work flow model comprises a graph-based model executed by a workflow engine configured on the one or more processors, wherein the first line comprises a solid line, and the second line comprises a dashed line.

11. The system of claim 9, wherein the first task and the second task comprise tasks of a business process.

12. The system of claim 9 further comprising:
receiving, from the user interface, information identifying the one or more tasks.

* * * * *